United States Patent
Oh et al.

(10) Patent No.: US 8,139,854 B2
(45) Date of Patent: Mar. 20, 2012

(54) METHOD AND APPARATUS FOR PERFORMING CONVERSION OF SKIN COLOR INTO PREFERENCE COLOR BY APPLYING FACE DETECTION AND SKIN AREA DETECTION

(75) Inventors: Hyun-hwa Oh, Yongin-si (KR); Du-sik Park, Suwon-si (KR); Jung-bae Kim, Yongin-si (KR); Young-shin Kwak, Suwon-si (KR); Chang-yeong Kim, Yongin-si (KR); Seok-cheol Kee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 982 days.

(21) Appl. No.: 11/483,769

(22) Filed: Jul. 11, 2006

(65) Prior Publication Data

US 2007/0031032 A1    Feb. 8, 2007

(30) Foreign Application Priority Data

Aug. 5, 2005  (KR) .................. 10-2005-0071887

(51) Int. Cl.
   *G06K 9/00* (2006.01)
(52) U.S. Cl. ........ 382/167; 382/103; 382/162; 382/164; 382/165; 382/173; 382/254; 382/274; 358/515
(58) Field of Classification Search .......... 382/164, 382/165, 167, 115, 118, 199, 195, 274, 243; 358/518, 515
   See application file for complete search history.

(56) References Cited

U.S. PATENT DOCUMENTS

| | | | | |
|---|---|---|---|---|
| 5,130,935 | A * | 7/1992 | Takiguchi | 382/167 |
| 5,296,945 | A * | 3/1994 | Nishikawa et al. | 358/518 |
| 5,430,809 | A * | 7/1995 | Tomitaka | 382/173 |
| 6,529,630 | B1 * | 3/2003 | Kinjo | 382/190 |
| 6,574,354 | B2 * | 6/2003 | Abdel-Mottaleb et al. | 382/118 |
| 6,711,286 | B1 * | 3/2004 | Chen et al. | 382/162 |
| 7,082,211 | B2 * | 7/2006 | Simon et al. | 382/118 |
| 2002/0126893 | A1 * | 9/2002 | Held et al. | 382/167 |
| 2002/0176609 | A1 * | 11/2002 | Hsieh et al. | 382/118 |
| 2003/0053685 | A1 * | 3/2003 | Lestideau | 382/164 |
| 2005/0281464 | A1 * | 12/2005 | Kaku | 382/173 |

(Continued)

FOREIGN PATENT DOCUMENTS

JP   8-287216   11/1996

(Continued)

OTHER PUBLICATIONS

Viola et al. "Robust Real-Time Face Detection", International Journal of Computer Vision, 2004, vol. 57 Issue 2, pp. 137-154.*

(Continued)

*Primary Examiner* — Sath V Perungavoor
*Assistant Examiner* — Jason Heidemann
(74) *Attorney, Agent, or Firm* — Staas & Halsey LLP

(57) ABSTRACT

A method and apparatus for performing a conversion of a skin color of an input image into a preference color by applying face detection and skin color detection is disclosed. The method includes: detecting a face area from the input image; detecting a skin area from the input image; judging a common area between the face area and the skin area as a face; extracting a skin color from the input image with reference to the skin color in the judged face; and converting the extracted skin color into an image-adaptive skin color.

19 Claims, 8 Drawing Sheets

U.S. PATENT DOCUMENTS

| | | | |
|---|---|---|---|
| 2006/0008145 A1* | 1/2006 | Kaku | 382/173 |
| 2006/0126964 A1* | 6/2006 | Chen | 382/286 |
| 2007/0041640 A1* | 2/2007 | Tabata et al. | 382/173 |

FOREIGN PATENT DOCUMENTS

| | | |
|---|---|---|
| JP | 2001-216518 | 8/2001 |
| JP | 2004-246456 | 9/2004 |
| JP | 2005-148915 | 6/2005 |
| KR | 10-2000-0050399 | 8/2000 |

OTHER PUBLICATIONS

Kim et al. "Preferred skin color reproduction based on adaptive affine transform," Feb. 2005, IEEE Trans. Consumer Electronics, pp. 191-197.*

Terrillon et al., "Automatic Detection of Human Faces in Natural Scene Images by Use of a Skin Color Model and of Invariant Moments", In Proc. of the Third International Conference on Automatic Face and Gesture Recognition, 1998, pp. 112-117.*

Chai et al., "Locating Facial Region of a Head-and-Shoulders Color Image", In Proc. of the Third International Conference on Automatic Face and Gesture Recognition, 1998, pp. 124-129.*

Peck ("Beginning GIMP: From Novice to Professional—Chapter 10, Advanced Compositing", Springer-Verlag NewYork, May 1, 2006 pp. 381-384, hereinafter Peck).*

Gimp Quick Reference Card v.1.0 (2002).*

Korean Office Action dated Jul. 29, 2011, issued in Korean Patent Application No. 10-2005-0071887.

* cited by examiner

METHOD AND APPARATUS FOR PERFORMING CONVERSION OF SKIN COLOR INTO PREFERENCE COLOR BY APPLYING FACE DETECTION AND SKIN AREA DETECTION

CROSS-REFERENCE TO RELATED APPLICATION

This application is based on and claims priority from Korean Patent Application No. 10-2005-0071887, filed on Aug. 5, 2005, the disclosure of which is incorporated herein by reference.

BACKGROUND OF THE INVENTION

1. Field of the Invention

The present invention relates to the skin color conversion, and more particularly to a method and apparatus for performing a conversion of a skin color of an input image into a preference color by applying face detection and skin color detection.

2. Description of Related Art

With the development of digital appliances, the type of imaging works has been rapidly changed from analog to digital. Currently, research is under way in the field in which appliances that digitally capture and store images can process stored digital images so that they satisfy the human visual recognition.

In devices such as digital cameras or digital camcorders that capture and store images, skin color is one of the first elements the eyes focus on. Accordingly, proper conversion of the skin color is important in improving the performance of such digital image devices. In addition, converting the skin color is also important in other software and hardware that converts digital images.

In order to convert the skin color of a captured image into a natural skin color, it is necessary to apply a skin color to a portion of an image corresponding to a human skin, while no skin color conversion is performed with respect to a portion corresponding to a background or another object that has a color similar to the human skin color but does not correspond to the human skin.

Conventionally, a method for detecting a skin area in an image using a predefined skin color and converting the color of the skin area has been proposed. A skin color in an image can be converted into a preference skin color through a lookup table or a color conversion equation between a reference color and a target color. Also, a method for performing a color conversion with respect to an area corresponding to a human face has been proposed. According to this method, the contour of a face is extracted, and a color conversion is performed with respect to the corresponding area.

However, according to the conventional skin color conversion method that detects the color of the skin and converts the corresponding color into a preference color, a color that does not correspond to the skin may be converted into the preference color. Also, according to the conventional skin color conversion method that extracts the contour of the face and converts the corresponding color into the preference color, a color discontinuity may occur on the boundary of the face area. Accordingly, a method whereby the color of an actual skin area can be converted into the preference color is required.

BRIEF SUMMARY

An aspect of the present invention provides a method and apparatus for converting a skin color of an input image adaptively to the image.

Another aspect of the present invention applies a method of detecting a common area between a face area and a skin area in judging a skin color.

According to an aspect of the present invention, there is provided a method of performing a conversion of a skin color of an input image into a preference color by applying a face detection and a skin area detection, according to the present invention, which includes: detecting a face area from the input image; detecting a skin area from the input image; judging a common area between the face area and the skin area as a face; extracting a skin color from the input image area with reference to the skin color in the judged face; and converting the extracted skin color into an image-adaptive skin color.

According to another aspect of the present invention, there is provided an image device, which includes: a face detection unit detecting a face area from an input image; a skin area detection unit detecting a skin area from the input image; a face area extraction unit judging a common area between the face area and the skin area as a face; and a skin color conversion unit extracting a skin color from the input image with reference to the skin color of the judged face, and converting the extracted skin color into an image-adaptive skin color.

According to another aspect of the present invention, there is provided a method of adaptively converting a skin color of an input image into a desired color, the method includes: determining a common area between detected face and skin areas of the input image; generating a skin color model of the common area; determining an actual skin area based on the skin color model by extracting a skin color from the input image based on a skin color in the common area; and converting the extracted skin color into an image-adapted skin color.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE PREFERRED EMBODIMENTS

Figure 1:
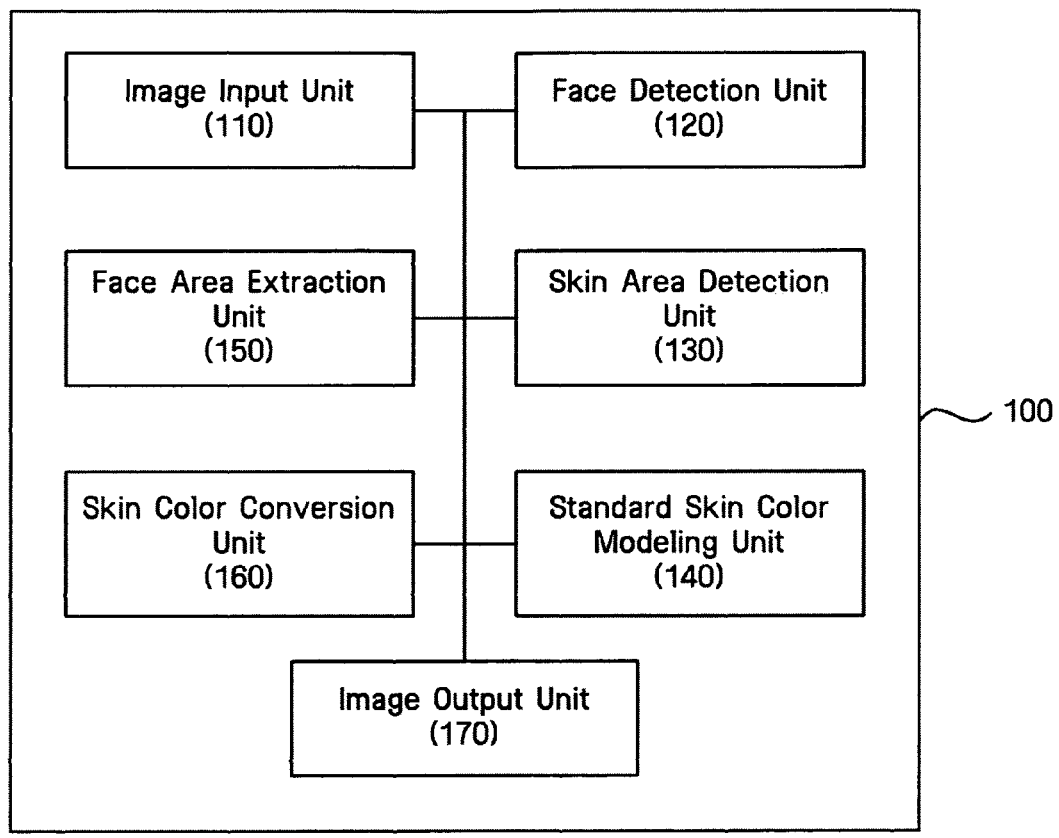
FIG. 1 is a block diagram illustrating the construction of an apparatus for converting a skin color of an input image into a desired color according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Embodiments present invention will be described with reference to the accompanying drawings illustrating block diagrams and flowcharts for explaining a method and apparatus for performing a conversion of a skin color of an input image into a preference color by applying a face detection and a skin color detection according to the embodiments. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowcharts may represent a module, segment, or portion of code, which comprises one or more executable instructions for implementing the specified logical function(s). It should also be noted that in some alternative implementations, the functions noted in the blocks may occur in an order that differs from that shown and or described. For example, two blocks shown in succession may be executed substantially concurrently or the blocks may sometimes be executed in the reverse order, depending upon the functionality involved.

FIG. 1 is a block diagram illustrating the construction of an apparatus for converting a skin color of an input image into a desired color according to an embodiment of the present invention.

In the embodiment of the present invention, the term "unit", that is, "module" or "table", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

An image device 100 may be, by way of non-limiting examples, a TV receiver or a DVD player in addition to a digital image processing device such as a digital camera and a digital camcorder. Also, the image device may be an image reproducing device such as, by way of non-limiting examples, a computer, a PDA, a mobile phone, or a personal multimedia player (PMP). The construction as illustrated in FIG. 1 may be included in software that processes images.

An image input unit 110 receives an input of an image or a file from storage or from, for example, a digital camera or digital camcorder. The input image is provided to a face detection unit 120 and a skin area detection unit 130.

The face detection unit 120 detects the face area from the input image, and outputs spatial position information of a face area. In order to detect the face, various methods can be used. Non-limiting examples include an AdaBoost method, a neural network based detection method, and a statistical method have been used. The AdaBoost has a structure in which various stages having weak classifies are connected in the form of a cascade. Accordingly, if the detection fails at the present stage, its sub-window (i.e., face candidate) is judged as an image that is not the face, i.e., non-face. Only sub-windows in which the detection has succeeded at the present stage are inputted to the subsequent stage, and if the detection succeeds up to the final stage, the corresponding area is judged as a face. In order to detect a side face, a turned face, or an inclined face, which is not a full face, the weak classifiers may be learned using face features inclined on X-, Y-, and Z-axes, respectively. Also, in order to detect faces having diverse sizes, the size of a sub-window that is parallel to X and Y-axes may be varied instead of using a fixed-size sub-window.

The neural network based method checks small windows constituting an image, and judges whether the respective windows include the face. It can provide a high performance by adjusting multiple networks, in comparison to the face detection method using one network. The neural networks can be learned using a case where an error occurs in judging a face by extracting negative examples.

The statistical method can recognize an face by applying a classifier based on the statistical values of localized parts of an image. The classifier calculates the results of matching the respective parts to the image, and obtains the probability according to the condition of the corresponding classification. Then, the method decides the object recognized through a likelihood ratio test. This method has also proposed a scheme for increasing resolution stages from a low resolution to a high resolution in order to find the faces.

The skin area detection unit 130 extracts pixels corresponding to a skin color from an input image by using a standard skin color model unit 140 predefined in a color space. In this case, the extracted results are not limited to the skin area only. That is, since the skin area detection unit extracts pixels having errors within a predetermined skin-color range, it may extract pixels of a background of the image having a color similar to the skin color or pixels of the image in addition to the skin area.

Also, the skin area detection unit 130, in order to improve the processing speed, may extract a face area by extracting the skin area from a part detected as a face, not from the entire input image, and checking the ratio of a skin color area to the part detected as the face.

A face area extraction unit 150 compares a face area judged by the face detection unit 120 with an area where the skin color extracted by the skin area detection unit 130 exists, and judges an area where the face area and the skin color area commonly overlap each other as the face area. If the common area exists, a process of verifying whether the corresponding area is the face area may be additionally performed. That is, a process of judging whether the corresponding area corresponds to the actual face based on the ratio of pixels corresponding to the skin color to those corresponding to the face area, the size of the face area, and others. If the corresponding area does not correspond to the face area as a result of judgment, the input image may be outputted without the skin color conversion.

The skin color existing in the face area judged by the face area extraction unit 150 can be considered as the skin color used for the image. Accordingly, the skin color conversion is made with respect to the entire image based on the actual skin color existing in the face area.

The skin color conversion unit 160 redetects the pixels corresponding to the actual skin color area with respect to the entire image, based on information about the actual skin color extracted by the face area extraction unit 150, and converts the color of the corresponding pixels into a preference (desired) skin color. In other words, this process of redetecting the pixels having the corresponding skin color is performed in consideration of the fact that the skin color existing in the face area is representative of the skin colors existing in the image. The result of redetection may be different from the result of detection by the skin area detection unit 130. This result is output through an image output unit 170. Constituent elements of the skin color conversion unit 160 are illustrated in FIG. 2.

Figure 2:
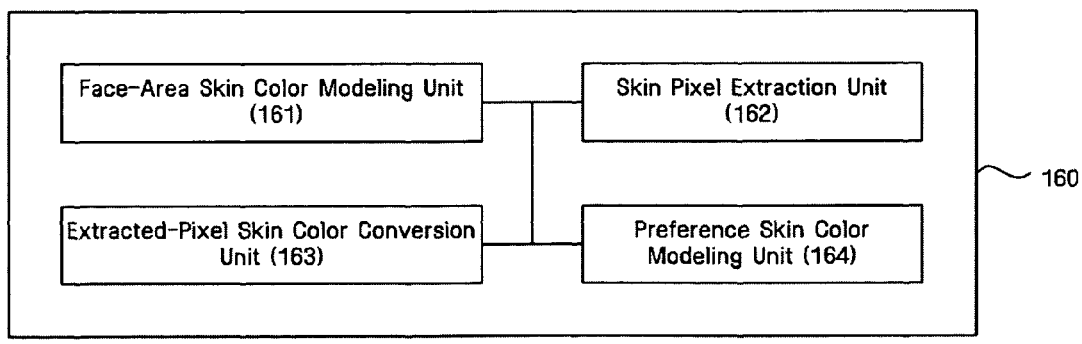
FIG. 2 is a block diagram illustrating the construction of a skin color conversion unit according to an embodiment of the present invention.

FIG. 2 is a block diagram illustrating the construction of a skin color conversion unit according to an embodiment of the present invention. As shown in FIG. 2, the skin color conversion unit includes a face-area skin color modeling unit 161, a skin pixel extraction unit 162, an extracted-pixel skin color conversion unit 163, and a preference skin color modeling unit 164.

The skin color modeling unit 161 judges the color of the pixels corresponding to the face area detected by the face area extraction unit 150 as the actual skin color existing in the input image, and remodels the skin color area in a color space of the input image, using the detected actual skin color.

The skin pixel extraction unit 162 extracts the pixels corresponding to the remodeled skin color area from the entire image. This is for searching for corresponding colors, considering the color of the area recognized as the face area as the skin color, and converting the searched colors into the preference color.

The extracted-pixel skin color conversion unit 163 converts the skin color of the pixels extracted by the skin pixel extraction unit 162 into the preference skin color. The extracted-pixel skin color conversion unit 163 can adaptively change the color of the image to a target color. The color can be changed based on a two-dimensional (2-D) or three-dimensional (3-D) skin color model, and in this case, a lookup table for changing a function or color between two mapping colors can be used.

The preference skin color modeling unit 164 provides in advance the selected color in consideration of the human preference and characteristics of a device subject to application.

Figure 3:
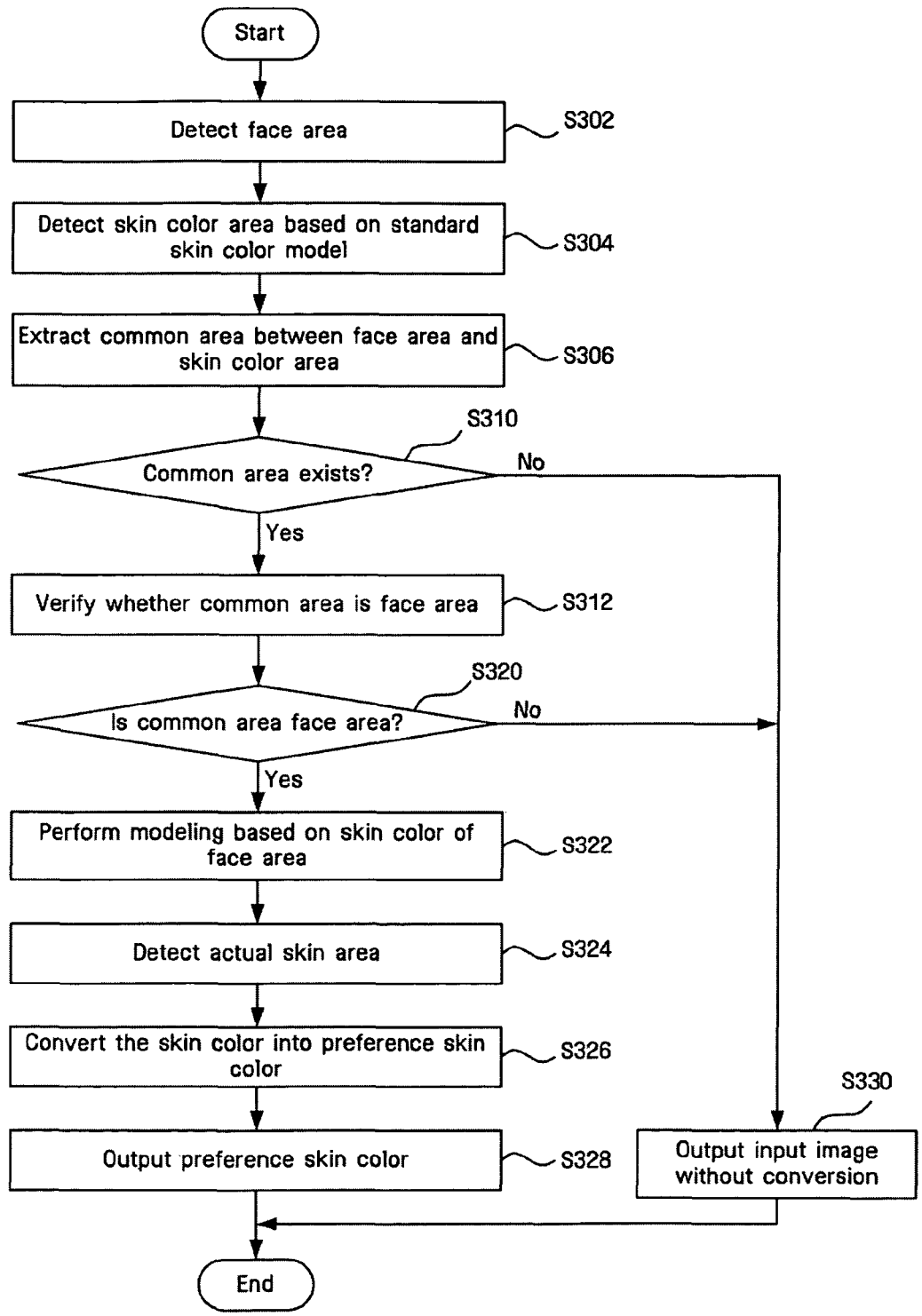
FIG. 3 is a flowchart illustrating a process of converting a skin color of an input image into a desired color by detecting a face area of the input image according to an embodiment of the present invention.

FIG. 3 is a flowchart illustrating a process of converting a skin color of an input image into a preference color by detecting a face area of the input image according to an embodiment of the present invention.

First, a face area is detected S302. An AdaBoost based face detection method, a neural network based method, and a statistical method may be used for the detection of the face area. In particular, it is required for such a face detection method to secure a high execution speed and a low false rejection rate (FRR) so that it can be applied to an image acquiring or outputting device.

Then, a skin color area is detected based on the standard skin color mode S304. That is, pixels corresponding to the skin color are detected based on information about the skin color defined by the standard skin color unit. Then, a common area between two areas detected in operations S302 and S304 is extracted, in operations S306 and S310. This is because, if an area having the contour of a face also has a skin color, there is a high possibility that the area corresponds to the face. Accordingly, if the common area exists, a process of changing the skin color of the corresponding area to a preference color, in consideration of the area as the face, is performed. By contrast, if no common area exists, it is judged that no area corresponding to the skin exists, and the input image is outputted without any conversion S330.

If the common area exists in operation S310, a process of verifying whether the corresponding area is the face area may be additionally performed S312. In order to exclude colors except for the skin color from the face area detected in the form of a tetragon, a process of verifying the corresponding area as the actual face area is performed if the ratio of the size of the tetragon to the number of pixels corresponding to the skin color in the tetragon is greater than a threshold value. If the common area corresponds to the face as a result of verification S320, a process of changing the skin color of the corresponding area to the preference color is performed in consideration of the corresponding area as the face. By contrast, if the common area does not exist, the process proceeds to operation S330.

If the common area extracted in the operation S306 is the face area, modeling is performed based on the skin color of the corresponding area S322. That is, a skin color model can be set by distributing the skin color of the face area in the color space, in consideration of the color of the face area as the skin color. For example, an image reference skin color model can be set in the form of a 2-dimensional ellipse. Then, the actual skin area is detected based on the skin color model S324. The operation S324 is a process of extracting the skin area from the input image, and the extracted skin area may be not identical to the skin area extracted in the operation S304. Then, the area having the extracted skin color is converted into the preference (desired) skin color S326. As an example, a 2-dimensional color conversion method based on a moving of mass point in ellipse (MMPE) can be used as the skin color conversion method. Last, an image having the converted (desired) skin color is outputted S328. The converted image may be stored in a storage device.

Figure 4:
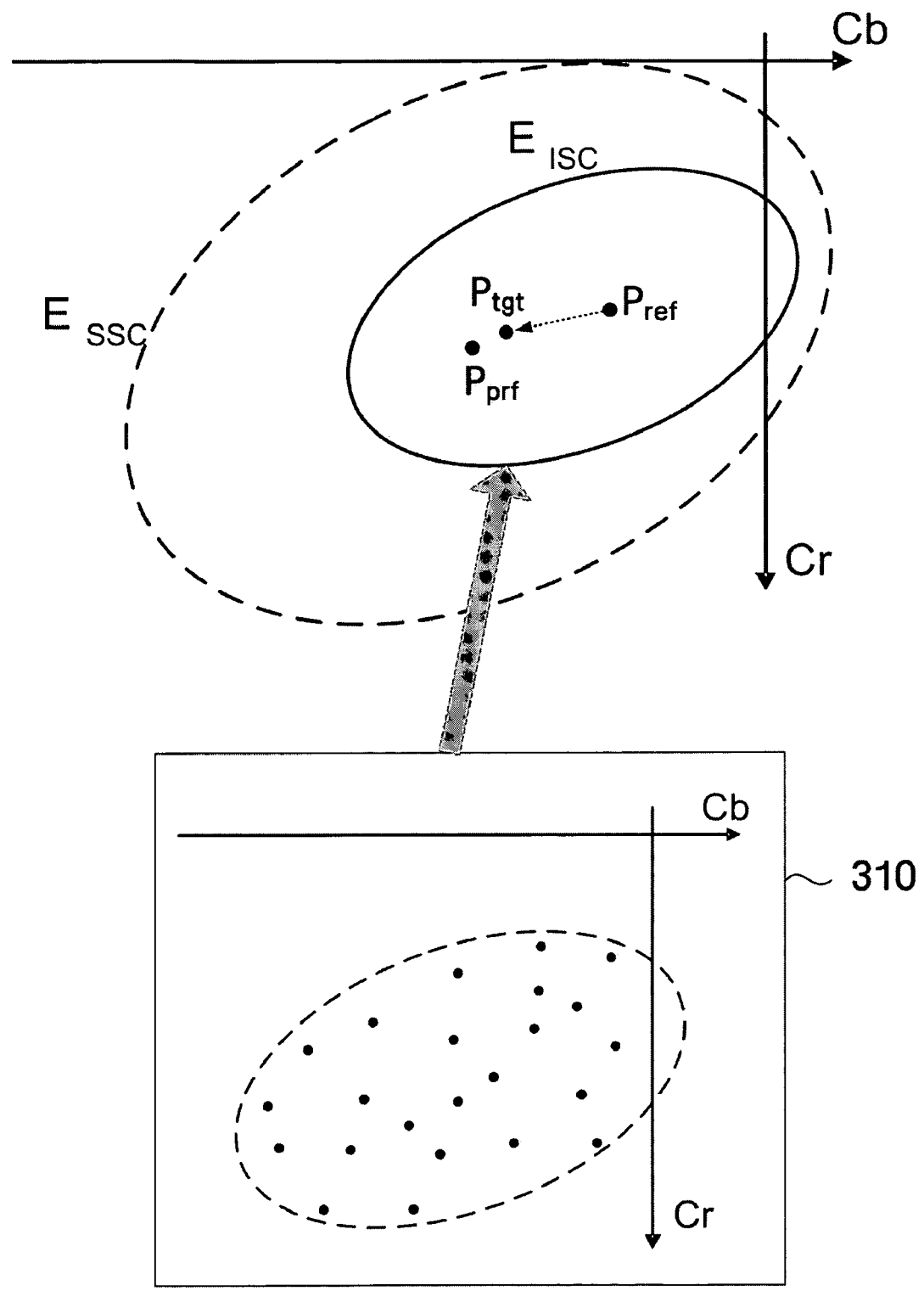
FIG. 4 is an exemplary view illustrating a process of re-determining a target color in a color space for expressing an image-adaptive desired skin color according to an embodiment of the present invention.

FIG. 4 is an exemplary view illustrating a process of re-determining a target color in a color space for expressing an image-adaptive preference skin color according to an embodiment of the present invention.

In FIG. 4, an area of the standard preference skin color is expressed as $E_{SSC}$ in a 2-dimensional color space (Cb, Cr), and an area of a skin color of an input image is expressed as $E_{ISC}$. The positions of colors that are considered as the actual skin color in an input image are indicated by 310 in color coordinates, and the skin color of the input image can be expressed by providing an ellipse that includes all the corresponding coordinates. In FIG. 4, the area is indicated by en ellipse. However, this is exemplary, and the area can also be expressed by a circle or a tetragon. Also, a 3-dimensional area, instead of a 2-dimensional area, may be selected as the skin color area.

FIG. 4 illustrates a case where the coordinates $P_{prf}$ of the standard preference skin target color are located inside the skin color area $E_{ISC}$. $P_{prf}$ may be the center point of the standard preference skin target color, or a specified point of the ellipse, for example, the focus of the ellipse. On the assumption that the center point of the skin color area $E_{ISC}$ of the input image is $P_{ref}$, the coordinates $P_{tgt}$ of the target of the color conversion can be finally calculated based on the relation between $P_{ref}$ and $P_{prf}$. $P_{tgt}$ is calculated using Equation (1).

$$P_{tgt}=rP_{ref}+(1-r)P_{prf}(0<r<1) \quad (1)$$

In Equation (1), by adjusting the value of r, the coordinates of the final color conversion target color can be obtained. As r approaches "0", the color conversion can be performed based on the standard preference skin target color, and as r approaches "1", the color conversion is performed so that the converted color becomes similar to the skin color of the input image.

Figure 5:
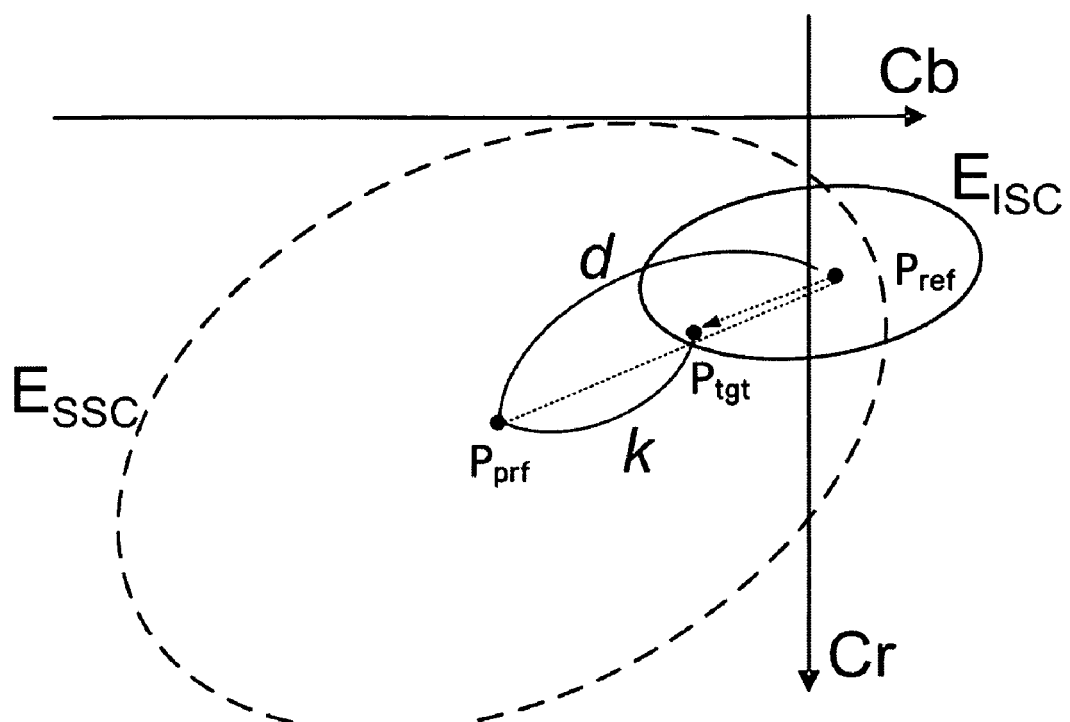
FIG. 5 is an exemplary view illustrating a process of re-determining a target color in a color space for expressing an image-adaptive desired skin color according to another embodiment of the present invention.

FIG. 5 is an exemplary view illustrating a process of re-determining a target color in a color space for expressing an image-adaptive preference skin color according to another embodiment of the present invention. Unlike the case of FIG. 4, FIG. 5 illustrates a case where $P_{prf}$ is located outside $E_{ISC}$.

In the case where $P_{prf}$ is located outside $E_{ISC}$, the distance between $P_{prf}$ and $P_{ref}$ becomes longer. In this case, if the target color $P_{tgt}$ is too close to $P_{prf}$, it is possible that the original color is excessively distorted. Accordingly, a process of adjusting the distance d between $P_{prf}$ and $P_{ref}$ and the distance k between $P_{prf}$ and $P_{tgt}$ is required as follows.

for $i=0; i<N; i++$ $k = d/N*i$ $P_{tgt}=k/d*P_{ref}+(d-k)/d*Pprf$

If($P_{tgt} \in E_{ISC}$)stop

Figure 6:
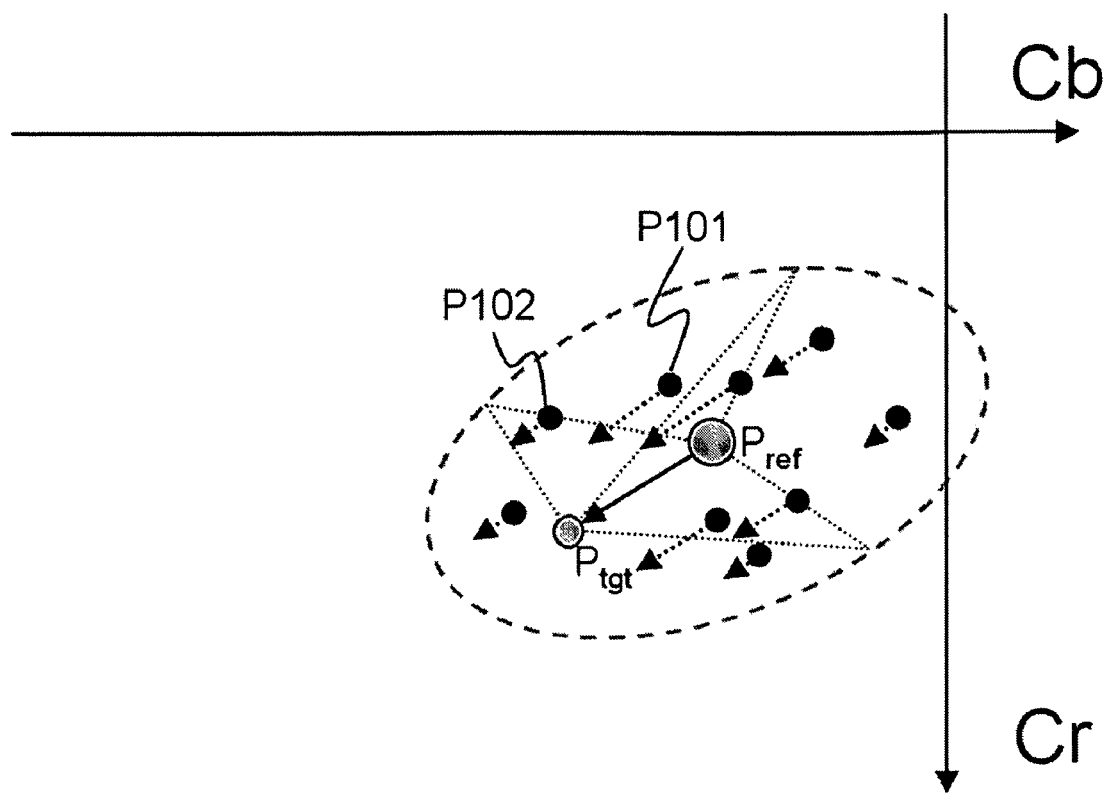
FIG. 6 is an exemplary view illustrating a color conversion according to a target color re-determination according to an embodiment of the present invention.

FIG. 6 is an exemplary view illustrating a color conversion according to a target color re-determination according to an embodiment of the present invention.

In FIGS. 4 and 5, when the target color $P_{tgt}$ is obtained, a process of converting the skin colors in the image on the basis of the target color is required. It can be unnatural or artificial if every skin color is converted to the target color $P_{tgt}$. In this case, the color conversion can be performed in consideration of the ratio of the skin color to $P_{tgt}$ as shown in FIG. 6. Specifically, the color conversion can be performed in consideration of the ratio of the coordinates $P_{ref}$ in the image to the color of another skin color and the relative position of $P_{tgt}$. In comparing positions P101 and P102 with $P_{tgt}$, there exists a difference in position between them. If P101 and P102 are converted in the same method, the property of the original color may be distorted, and thus different conversion methods may be applied to them. However, the conversion can be performed with reference to the relative positions of $P_{ref}$ and $P_{tgt}$ so that the entire flow of conversion moves from Pref to $P_{tgt}$.

Figure 7:
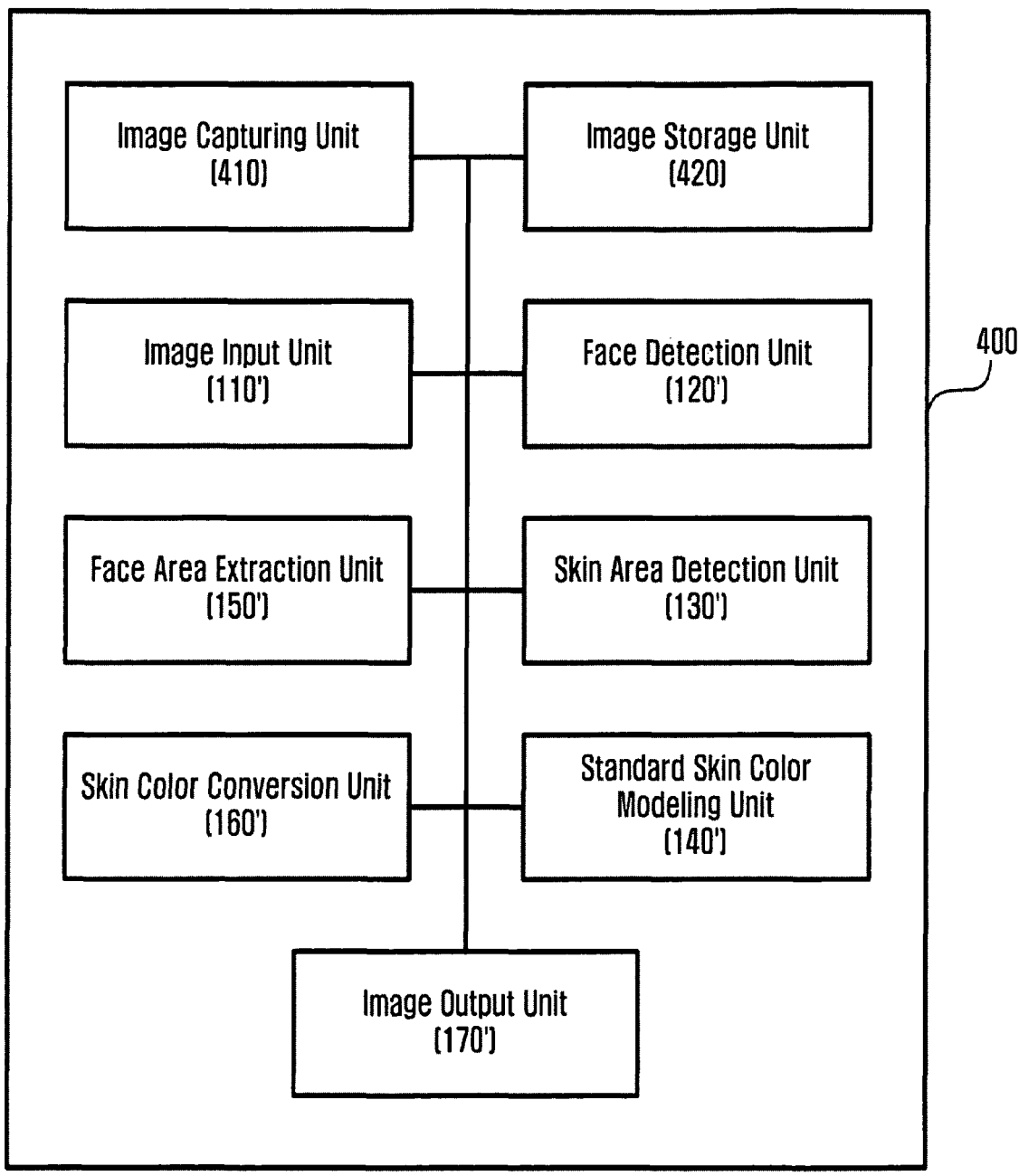
FIG. 7 is a block diagram illustrating the construction of an image device for converting a skin color adaptively to an image according to an embodiment of the present invention.

FIG. 7 is a block diagram illustrating the construction of an image device for converting a skin color adaptively to an image according to an embodiment of the present invention.

The image device 400 may be a digital camera, a digital camcorder, and others. The image device may also be a digital camera attached to the digital device such as a mobile phone. Except for an image capturing unit 410 and an image storage unit 420, other constituent elements are the same as those as illustrated in FIG. 1, the detailed explanation thereof will be omitted.

An image captured by the image capturing unit 410 is stored in the image storage unit 420. The image information from the image storage unit 420 is inputted to the image input unit 110'. The face detection unit 120' and the skin area detection unit 130' detect the face and the skin area from the image captured by the image capturing unit and inputted through the image input unit. The face area detection unit 150' extracts the common area of the detected face and skin areas as the face area, and the skin color conversion unit 160' re-extracts the skin color from the entire image based on the skin color of the face area, and converts the skin color into a skin color adaptively to the image. The result of skin color conversion is stored in the image storage unit 420, or outputted to a user through the image output unit 170'.

In addition, a DVD, VTR, and DVD for reproducing an image may perform the process of converting the skin color with respect to the input image. In this case, the image reproducing device may include an image receiving unit that receives an image signal from, by way of non-limiting examples, a DVD ROM, video tape, or digital broadcasting signal, instead of the image capturing unit 410 of FIG. 7. Of course, the image input unit 110' may serve as the image receiving unit.

Figure 8:
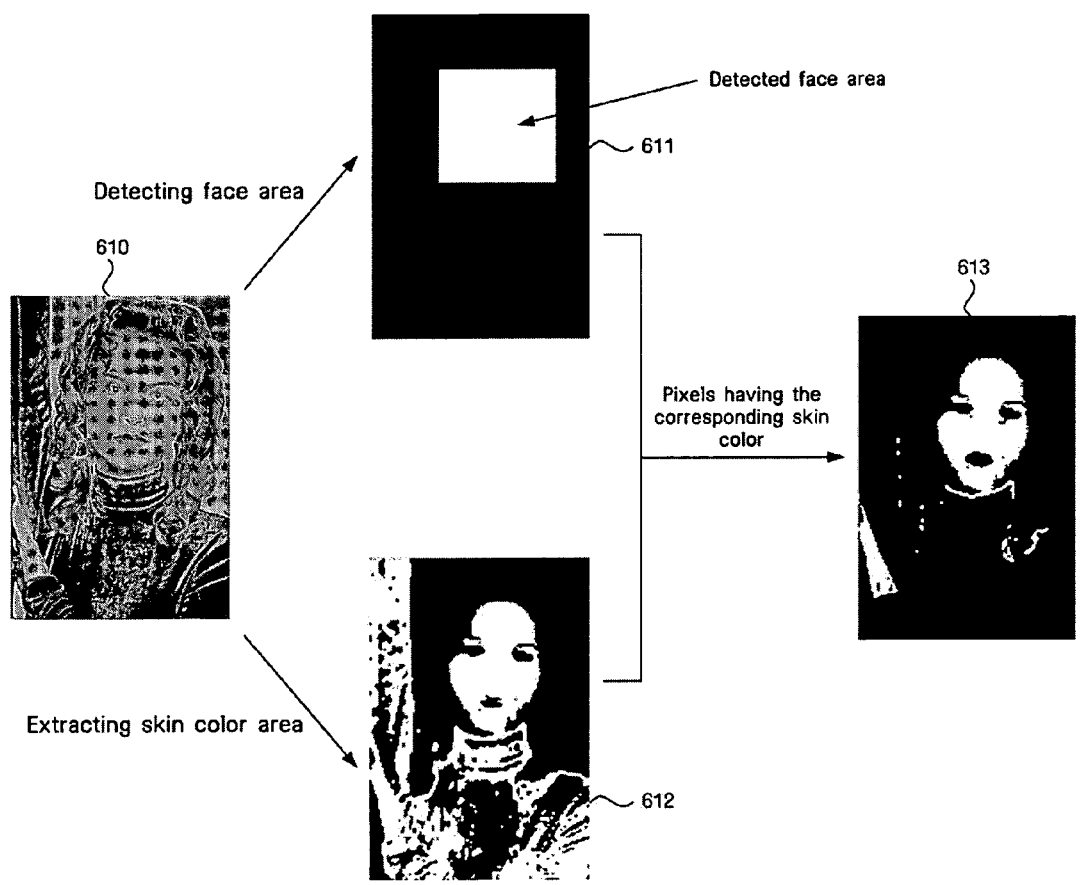
FIG. 8 is an exemplary view illustrating a process of extracting an actual skin color area by detecting a face area and a skin color area according to an embodiment of the present invention.

FIG. 8 is an exemplary view illustrating a process of extracting an actual skin color area by detecting a face area and a skin color area according to an embodiment of the present invention.

The result of detecting the face area from the input image 610 is indicated as 611. In order to detect the face area, a AdaBoost method, a neural network based method, a statistical method, and others, may be adopted. In FIG. 8, a tetragon area including the face area corresponds to the result of face area detection using the AdaBoost method.

The result of extracting the skin color area by checking the pixels of the input image 610 having the color defined as the skin color by the standard skin color model unit is indicated as 612. The pixels corresponding to the skin color are extracted from the input image by using the standard skin color model unit predefined in the color space. In this case, as indicated as 612, the result of extraction is not limited to the skin area. This is because since the pixels having the color defined as the skin color are extracted, the pixels which are included in clothes or a background and which have the color corresponding to the skin color are judged to have the skin color.

Accordingly, the common area of the face area 611 and the skin area 612 is judged as the face, the skin color existing in the face is judged as the actual skin color, and the pixels having the corresponding skin color are extracted from the entire image. The result of extraction is indicated as 613, and from this, it can be recognized that the areas corresponding to the actual skin color are selected.

Figure 9:
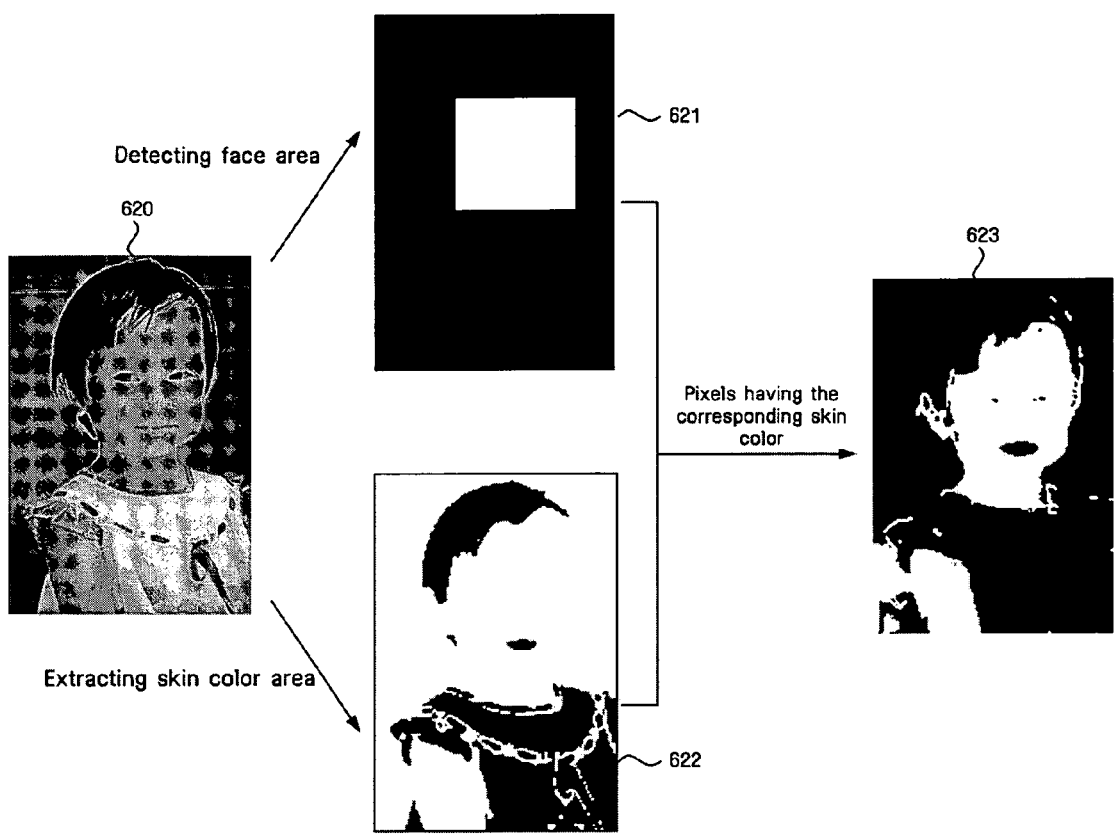
FIG. 9 is an exemplary view illustrating a process of extracting an actual skin color area by detecting a face area and a skin color area according to another embodiment of the present invention.

FIG. 9 is an exemplary view illustrating a process of extracting an actual skin color area by detecting a face area and a skin color area according to another embodiment of the present invention.

The result of detecting the face area from the input image 620 is indicated as 621. In order to detect the face area, a AdaBoost method, a neural network based method, a statistical method, and others, may be adopted. In FIG. 9, a tetragon area including the face area corresponds to the result of face area detection using the AdaBoost method.

The result of extracting the skin color area by checking the pixels of the input image 620 having the color defined as the skin color by the standard skin color model unit is indicated as 622. The pixels corresponding to the skin color are extracted from the input image by using the standard skin color model unit predefined in the color space. In this case, as indicated as 622, the result of extraction is not limited to the skin area, and most of the background is extracted as the skin color. This is because since the pixels having the color defined as the skin color are extracted, the pixels which are included in clothes or the background and which have the color corresponding to the skin color are judged to have the skin color.

Accordingly, the common area of the face area 621 and the skin area 622 is judged as the face, the skin color existing in the face is judged as the actual skin color, and the pixels having the corresponding skin color are extracted from the entire image. The result of extraction is indicated as 623, and from this, it can be recognized that the areas corresponding to the actual skin color are selected. Since the skin color of the background is different from the skin color of the face, it is not selected as the area having the actual skin color.

According to the above-described embodiments of the present invention, the skin color of the input image can be converted adaptively to the image.

Also, the actual skin color of the image can be judged by detecting the common area of the face area and the skin color area.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of performing a conversion of a skin color of an input image into a desired color implemented by an image device comprising a processor having computing device-executable instructions, the method comprising:
   detecting a face area from the input image;
   extracting the face area from the input image;
   detecting a first skin area from the input image;
   extracting the first skin area from the input image;
   judging a common area between the face area and the first skin area having a common overlap as a face;
   extracting a second skin area, which is the same as the first skin area or which is different from the first skin area, from the input image based on a first skin color in the common area; and
   converting a second skin color of the second skin area into an image-adaptive skin color.

2. The method of claim 1, wherein the detecting a face image includes detecting the face using an AdaBoost method.

3. The method of claim 1, wherein the detecting the first skin area includes detecting pixels having the skin color with reference to a standard skin color model.

4. The method of claim 1, wherein the judging includes:
   calculating the ratio of pixels corresponding to the first skin color to pixels corresponding to the common area in the common area, and when the result of calculation is greater than a predetermined value, judging the common area as the face.

5. The method of claim 1, wherein the extracting the second skin area includes:
   performing a skin color modeling based on the first skin color of the judged face;
   detecting the second skin area from the input image based on a result of modeling; and
   extracting the second skin color in the skin area.

6. The method of claim 1, wherein the converting includes:
   distributing the second skin color in a color space;
   obtaining a reference point of a standard color area and a reference point of the color area, and calculating a target point for converting the second skin color distributed in the color area; and
   converting the second skin color based on the calculated target point.

7. An image device comprising:
   a processor;
   a face detection unit, controlled by the processor, that detects a face area from an input image;
   a skin area detection unit, controlled by the processor, that detects a first skin area from the input image;
   a face area extraction unit, controlled by the processor, that judges a common area between the face area and the first skin area having a common overlap as a face, and extracts a first skin color from the common area; and
   a skin color conversion unit, controlled by the processor, that extracts a second skin area, which is the same as the first skin area or which is different from the first skin area, from the input image based on a first skin color in the common area, and that converts a second skin color of the second skin area into an image-adaptive skin color.

8. The image device of claim 7, wherein the face detection unit detects the face using an AdaBoost method.

9. The image device of claim 7, wherein the skin area detection unit detects pixels having the first skin color with reference to a standard skin color model.

10. The image device of claim 7, wherein the face area extraction unit extracts the face area as the common area when the area having the first skin color exceeds a predetermined range of the face area.

11. The image device of claim 7, wherein the face area extraction unit calculates a ratio of pixels corresponding to the first skin color in the detected face area to pixels corresponding to the detected face area, and when the result of calculation is greater than a predetermined value, the common area is judged as the face.

12. The image device of claim 7, wherein the skin color conversion unit includes:
   a face area skin color modeling unit performing a skin color modeling based on the first skin color of the judged face; and a skin pixel extraction unit detecting the second skin area from the input image based on a result of modeling, and extracting the second skin color in the second skin area.

13. The image device of claim 7, wherein the skin color conversion unit includes:
- a desired skin color modeling unit distributing the second skin color to a color space; and
- an extracted pixel skin color conversion unit calculating a target point for converting the second skin color distributed in the color area by obtaining a reference point of a standard color area and a reference point of the color area, and converting the second skin color based on the calculated target point.

14. The image device of claim 13, wherein a 2-dimensional color conversion method based on a moving of mass point in ellipse (MMPE) is used to convert the second skin color.

15. The image device of claim 7, further comprising a storage unit storing the image including the converted second skin color.

16. The image device of claim 7, further comprising an output unit outputting the image including the converted second skin color.

17. The image device of claim 7, wherein the image device is a device for capturing a digital image.

18. The image device of claim 7, wherein the image device is a device for reproducing a digital image.

19. A non-transitory computer-readable storage medium encoded with processing instructions for causing a processor to execute a method of performing a conversion of a skin color of an input image into a desired color, the method comprising:
- detecting a face area from the input image;
- extracting the face area from the input image;
- detecting a first skin area from the input image;
- extracting the first skin area from the input image;
- judging a common area between the face area and the first skin area having a common overlap as a face;
- extracting a second skin area, which is the same as the first skin area or which is different from the first skin area, from the input image based on a first skin color in the common area; and
- converting a second skin color of the second skin area into an image-adaptive skin color.

* * * * *